US012706709B2

(12) United States Patent
Xiao et al.

(10) Patent No.: US 12,706,709 B2
(45) Date of Patent: Aug. 11, 2026

(54) DETERMINATION METHOD AND APPARATUS, COMMUNICATION NODE, AND STORAGE MEDIUM

(71) Applicant: ZTE CORPORATION, Shenzhen (CN)

(72) Inventors: Huahua Xiao, Shenzhen (CN); Guozeng Zheng, Shenzhen (CN); Chuangxin Jiang, Shenzhen (CN); Shujuan Zhang, Shenzhen (CN); Zhaohua Lu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 895 days.

(21) Appl. No.: 17/995,626

(22) PCT Filed: Mar. 23, 2021

(86) PCT No.: PCT/CN2021/082482
§ 371 (c)(1),
(2) Date: Oct. 6, 2022

(87) PCT Pub. No.: WO2021/218497
PCT Pub. Date: Nov. 4, 2021

(65) Prior Publication Data

US 2023/0216628 A1 Jul. 6, 2023

(30) Foreign Application Priority Data

Apr. 30, 2020 (CN) ......................... 202010368132.5

(51) Int. Cl.
*H04L 5/00* (2006.01)
*H04W 4/02* (2018.01)

(52) U.S. Cl.
CPC .......... *H04L 5/0048* (2013.01); *H04L 5/0016* (2013.01); *H04W 4/023* (2013.01)

(58) Field of Classification Search
CPC .... H04L 5/0048; H04L 5/0016; H04W 64/00; H04W 4/023; H04W 24/02
See application file for complete search history.

(56) References Cited

U.S. PATENT DOCUMENTS 10,231,207 B2 3/2019 Lee et al.
12,192,131 B2 * 1/2025 Stare .................. H04L 27/2613
(Continued)

FOREIGN PATENT DOCUMENTS

CN 109391359 A 2/2019
CN 111901087 A 11/2020
(Continued)

OTHER PUBLICATIONS

3GPP Technical Specification Group Radio Access Network. "Feature Lead Summary #1 on AI 7.2.10.1—DL Reference Signals for NR Positioning," 3GPP TSG RAN WG1 Meeting #99, Nov. 2019, pp. 1-26.
(Continued)

*Primary Examiner* — Oussama Roudani
(74) *Attorney, Agent, or Firm* — Vivacqua Crane, PLLC

(57) ABSTRACT

Disclosed are a determination method, a determination apparatus, a communication node and a non-transitory computer readable storage medium. The determination method may include determining a comb and an orthogonal cover code of a positioning reference signal; and determining a pattern of the positioning reference signal based on the comb and the orthogonal cover code.

15 Claims, 6 Drawing Sheets

Determine a comb and an orthogonal cover code of a positioning reference signal — S110

Determine a pattern of the positioning reference signal based on the comb and the orthogonal cover code — S120

(56) References Cited

U.S. PATENT DOCUMENTS

| | | | | |
|---|---|---|---|---|
| 2013/0315168 | A1* | 11/2013 | Frank | G01S 5/0205<br>370/329 |
| 2020/0146000 | A1* | 5/2020 | Shin | H04L 27/2613 |
| 2020/0220681 | A1* | 7/2020 | Yang | H04L 5/001 |
| 2021/0014011 | A1* | 1/2021 | Xiong | H04L 1/1887 |
| 2021/0328846 | A1* | 10/2021 | Frenne | H04L 27/2613 |
| 2022/0007354 | A1* | 1/2022 | Si | H04L 5/005 |
| 2022/0014329 | A1* | 1/2022 | Qi | H04W 72/046 |

FOREIGN PATENT DOCUMENTS

| | | | |
|---|---|---|---|
| EP | 3949230 | A | 2/2022 |
| WO | 2017196067 | A1 | 11/2017 |
| WO | 2020198304 | A1 | 10/2020 |

OTHER PUBLICATIONS

European Patent Office. Extended European Search Report for EP Application No. 21797666.1, mailed May 16, 2024, pp. 1-9.

International Searching Authority. International Search Report and Written Opinion for PCT Application No. PCT/CN2021/082482 and English translation, mailed Jun. 11, 2021, pp. 1-10.

3GPP Technical Specification Group Radio Access Network. “UL Reference Signals for NR Positioning,” 3GPP TSG RAN WG1 Meeting #98, R1-1908660, Aug. 2019, pp. 1-8.

European Patent Office. Communication pursuant to Article 94(3) EPC for EP Application No. 21797666.1, mailed Mar. 5, 2026, pp. 1-8.

* cited by examiner

DETERMINATION METHOD AND APPARATUS, COMMUNICATION NODE, AND STORAGE MEDIUM

CROSS REFERENCE TO RELATED APPLICATIONS

This application is a national stage filing under 35 U.S.C. § 371 of international application number PCT/CN2021/082482, filed Mar. 23, 2021, which claims priority to Chinese patent application No. 202010368132.5, filed Apr. 30, 2020. The contents of these applications are incorporated herein by reference in their entirety.

TECHNICAL FIELD

The present disclosure relates to the field of communication, for example, to a determination method, a determination apparatus, a communication node and a non-transitory computer readable storage medium.

BACKGROUND

Positioning is an important technology in the wireless communication. For example, the positioning function is supported in the Long-Term Evolution (LTE), the Long-Term Evolution-Advanced (LTE-A), the New Radio Access Technology (NR) and other standards. Interference management in wireless communication systems is an effective approach to improve the system performance and also a hot topic in the research of wireless communication systems. Therefore, it is urgent to solve the technical problem of how to reduce interference in positioning wireless communication systems.

SUMMARY

The present disclosure provides a determination method, a determination apparatus, a communication node and a non-transitory computer readable storage medium.

An embodiment of the present disclosure provides a determination method, and the method includes determining a comb and an orthogonal cover code of a positioning reference signal, and determining a pattern of the positioning reference signal based on the comb and the orthogonal cover code.

Another embodiment of the present disclosure further provides a determination apparatus, and the apparatus includes a first determination module and a second determination module. The first determination module is configured to determine a comb and an orthogonal cover code of a positioning reference signal, and the second determination module is configured to determine a pattern of the positioning reference signal based on the comb and the orthogonal cover code.

Yet another embodiment of the present disclosure further provides a communication node, the communication node includes one or more processors and a storage device. The storage device is configured to store one or more programs which, when executed by the one or more processors, cause the one or more processors to implement the determination method according to any one of the embodiments of the present disclosure.

Yet another embodiment of the present disclosure further provides a non-transitory computer readable storage medium. The non-transitory computer readable storage medium is configured to store computer programs which, when executed by a processor, cause the processor to implement the determination method according to any one of the embodiments of the present disclosure.

DETAILED DESCRIPTION

Some embodiments of the present disclosure will be described below with reference to the accompanying drawings.

Steps shown in the flowcharts in the accompanying drawings may be executed in a computer system, for example, a set of computer-executable instructions. In addition, although a logic order is shown in the flowcharts, in some cases, the steps shown or described may be executed in an order different than herein.

Figure 1:
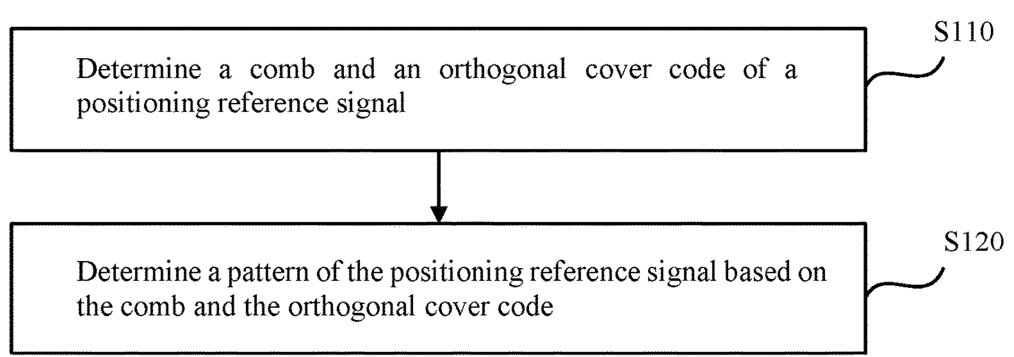
FIG. 1 is a flowchart of a determination method according to an embodiment of the present disclosure.

In an example embodiment, FIG. 1 is a flowchart of a determination method according to an embodiment of the present disclosure. The method may be applied to a situation of determining a pattern of a positioning reference signal. The method may be executed by a determination apparatus provided in the present disclosure, and the apparatus may be implemented by software and/or hardware and integrated on a communication node. The communication node encompasses any suitable type of terminal devices or base stations.

The technical schemes in the embodiment of the present disclosure may be applied to various communication systems, such as the LTE system, LTE Time Division Duplex (TDD), LTE enhanced version, the Universal Mobile Telecommunication System (UMTS), the 5th Generation mobile communication system (5G) NR communication system, and their evolved versions or other future wireless communication systems.

The base station may be an Evolutional Node B (eNB or eNodeB) in the LTE, a base station device in the 5G network, a base station in a future communication system, etc. The base station may include one or more of various macro base stations, micro base stations, home base stations, remote radio heads, routers, location servers, or primary cells and secondary cells, and various network-side devices and Location Management Functions (LMFs).

The terminal may be referred to as access terminal, user equipment (UE), user unit, user station, mobile station, remote station, remote terminal, mobile device, user terminal, terminal, wireless communication device, user agent or user device. For example, the terminal may be cellular phones, cordless phones, Session Initiation Protocol (SIP) phones, Wireless Local Loop (WLL) stations, Personal Digital Assistant (PDAs), handheld devices with wireless communication functions, computing devices or other processing devices connected to a wireless modem, vehicle-mounted devices, wearable devices, or terminal devices in the 5G network, etc., which will not be limited in the present disclosure.

The positioning reference signal includes a downlink positioning reference signal (PRS) for positioning in a downlink and an uplink sounding reference signal (SRS) for positioning, or may be other reference signals for positioning. In a terminal-assisted or terminal-based positioning method, the base station or location server generally transmits a PRS to a terminal to be positioned, and the terminal acquires positioning related parameters through the PRS. However, in a base station-based positioning method, the terminal will transmits an SRS for positioning, and the base station receives the SRS and acquires positioning related parameters. The configuration of the positioning reference signal includes at least one of the following: a period of the positioning reference signal, a pattern of the positioning reference signal, a transmitting slot of the positioning reference signal, a slot offset of the positioning reference signal, a sequence of the positioning reference signal, a slot duration number $N_{PRS}$ of the positioning reference signal, a muting period and offset of the positioning reference signal, etc. The pattern of the positioning reference signal is a set of resource elements (REs) occupied by the positioning reference signal in one or more slots. For a periodic positioning reference signal, the period and slot offset of the positioning reference signal may be determined by a combined parameter-positioning reference signal configuration index $I_{PRS}$, where the PRS muting period and offset are utilized to calculate slots in which the PRS is not transmitted. The slot is a symbol combination including at least two symbols.

The symbols include, but not limited to: Orthogonal Frequency Division Multiplexing (OFDM) symbols, Orthogonal Frequency Division Multiple Access (OFDMA) symbols and Single-Carrier Frequency Division Multiple Access (SC-OFDM) symbols. The determination method in the present disclosure may be regarded as a method for configuring a reference signal, mainly a method for determining a pattern of a positioning reference signal.

The Orthogonal Cover Code (OCC) is a set of orthogonal vectors. Each orthogonal cover code is a vector having a length of $K_{OCC}$, and the length $K_{OCC}$ is called the length of the orthogonal cover code. For example, when $K_{OCC}$ is 2, two orthogonal cover codes [1 1] and [1 −1] are included; and, when $K_{OCC}$ is 4, at least four orthogonal cover codes [1 1 1 1], [1 −1 1 −1], [1 −1 −1 1] and [−1 −1 1 1] may be included. The OCC may be applied to REs on different symbols in a time domain, which may be called a time domain orthogonal cover code. That is, all elements in the OCC are applied to time domain REs, and the corresponding length is the time domain length of the OCC. The OCC may be applied to REs on different frequency domains of a same symbol, which may be called a frequency domain orthogonal cover code. That is, all elements in the OCC are applied to frequency domain REs, and the corresponding length is the frequency domain length of the OCC. The OCC may be applied to REs on a plurality of frequency domains of a plurality of symbols, which may be called a time-frequency domain orthogonal cover code. That is, some elements in the OCC are applied to time domain REs, and the corresponding length is the time domain length of the OCC; while some elements are applied to frequency domain REs, and the corresponding length is the frequency domain length of the OCC.

A time domain interval of the orthogonal cover code refers to the interval between time domain symbols of corresponding REs in two elements in the orthogonal cover code. In a case where the time domain interval of the orthogonal cover code is 1, the REs corresponding to the elements of the orthogonal cover code are consecutive in time domain symbols; or otherwise, the REs are non-consecutive.

As shown in FIG. 1, the determination method provided in the present disclosure includes steps S110 to S120.

At S110, a comb and an orthogonal cover code of a positioning reference signal are determined.

In accordance with the present disclosure, the interference in the wireless communication system can be reduced by determining the pattern of the positioning reference signal. The approach to determine the comb and orthogonal cover code of the positioning reference signal will not be limited here and may be determined according to actual situations.

At S120, a pattern of the positioning reference signal is determined based on the comb and the orthogonal cover code.

When the comb and the orthogonal cover code are determined, at this step, the pattern of the positioning reference signal can be determined based on the comb and the orthogonal cover code, so that the positioning reference signal is transmitted based on the determined pattern, thereby reducing the interference in the positioning wireless communication system.

In an embodiment, in the present disclosure, the pattern of the positioning reference signal may be determined according to one or more of the following information: a value of the comb, a length of the orthogonal cover code, consecutiveness of the orthogonal cover code, and resource to which the orthogonal cover code belongs. The consecutiveness includes consecution and non-consecution. The resource to which the orthogonal cover code belongs at least includes a time domain and a frequency domain. The length of the orthogonal cover code includes a time domain length of the orthogonal cover code (i.e., the number of time domain REs (or the number of symbols) corresponding to one orthogonal cover code) and a frequency domain length of the orthogonal cover code (i.e., the number of frequency domain REs (or the number of sub-carriers) corresponding to one orthogonal cover code).

The determination approach will not be limited here as long as a starting resource element (RE) corresponding to each symbol corresponding to the positioning reference signal is ensured to have an interval greater than a set distance (that is, the distance between adjacent starting REs is as large as possible). The set distance may be set according to the actual situation and will not be limited here. The starting RE corresponding to each symbol corresponding to the positioning reference signal may also be referred to as a resource element offset or a frequency domain resource element offset or a frequency offset or an offset, which may be denoted by k'.

The present disclosure provides a determination method, including steps of: determining a comb and an orthogonal cover code of a positioning reference signal; and, determining a pattern of the positioning reference signal according to the comb and the orthogonal cover code. With this method, the interference in the positioning wireless communication system is reduced.

Based on the above embodiments, a variant embodiment of the above embodiments is provided. For simplicity of description, only differences from the above embodiments will be described in the variant embodiment.

In an embodiment, the determining a pattern of the positioning reference signal based on the comb and the orthogonal cover code includes:

- determining, based on a value of the comb and a feature of the orthogonal cover code, a resource element offset corresponding to each symbol corresponding to the positioning reference signal.

During the determination of the pattern of the positioning reference signal, in the present disclosure, the resource element offset of each symbol corresponding to the positioning reference signal may be determined based on the value of the comb and the feature of the orthogonal cover code, so that REs of the positioning reference signal are determined.

As an example, the resource element offset of the positioning reference signal on at least one slot or at least one frequency domain resource block is determined based on the value of the comb and the feature of the orthogonal cover code. The feature of the orthogonal cover code may be information representing the attributes of the orthogonal cover code. Here, the feature of the orthogonal cover code will not be limited. For example, the feature includes one or more of a length, a time domain interval, a time domain orthogonal cover code, a frequency domain orthogonal cover code, and a time-frequency domain orthogonal cover code.

In an embodiment, the feature of the orthogonal cover code includes one or more of a type, a time domain length, a time domain interval, and a frequency domain length; and, the type includes one or more of a time domain orthogonal cover code, a frequency domain orthogonal cover code, and a time-frequency domain orthogonal cover code.

In an embodiment, the resource element offset corresponding to each symbol corresponding to the positioning reference signal is successively $$(k'_1)_L, (k'_2)_L, \ldots, (k'_K)_L \text{ or } (k'_1, k'_2, \ldots, k'_K)_L, \text{ where } k'_1, k'_2, \ldots, k'_K$$

are integers from 0 to K−1 and different from each other, K is the value of the comb, L is the length of the orthogonal cover code, and $(*)_L$ means that the content in the bracket is repeated for L times.

In an embodiment, the determining, based on the value of the comb and the feature of the orthogonal cover code, a resource element offset corresponding to each symbol corresponding to the positioning reference signal includes:

- determining the minimum number of symbols of the positioning reference signal based on the product of the value of the comb and the time domain length of the orthogonal cover code, and determining resource element offsets corresponding to symbols corresponding to the positioning reference signal, where the number of symbols corresponding to the positioning reference signal being greater than or equal to the minimum number of symbols of the positioning reference signal, the resource element offsets corresponding to a same orthogonal cover code are identical, and the resource element offsets corresponding to different orthogonal cover codes are different.

As an example, in a case where the type of the orthogonal cover code is time domain orthogonal cover code, the minimum number of symbols of the positioning reference signal is determined based on the product of the value of the comb and the time domain length of the orthogonal cover code, and resource element offsets corresponding to symbols corresponding to the positioning reference signal are determined.

In an embodiment, the determining, based on the value of the comb and the feature of the orthogonal cover code, a resource element offset corresponding to each symbol corresponding to the positioning reference signal includes:

- determining a minimum number of symbols of the positioning reference signal based on the value of the comb, and determining resource element offsets and/or frequency domain resource element indexes corresponding to symbols corresponding to the positioning reference signal, where the number of symbols corresponding to the positioning reference signal being greater than or equal to the minimum number of symbols of the positioning reference signal, and the frequency domain resource element index corresponding to a same orthogonal cover code is determined by the resource element offset of the same symbol and the frequency domain length of the orthogonal cover code.

As an example, in a case where the type of the orthogonal cover code is frequency domain orthogonal cover code, the minimum number of symbols of the positioning reference signal is determined based on the value of the comb, and resource element offsets and/or frequency domain resource element indexes corresponding to symbols corresponding to the positioning reference signal are determined. For example, the value of the comb is determined as the minimum number of symbols of the positioning reference signal.

In an embodiment, the determining, based on the value of the comb and the feature of the orthogonal cover code, a resource element offset corresponding to each symbol corresponding to the positioning reference signal includes:

- determining the minimum number of symbols of the positioning reference signal based on the product of the value of the comb and the time domain length of the orthogonal cover code, and determining resource element offsets and/or frequency domain resource element indexes corresponding to symbols corresponding to the positioning reference signal, where the number of symbols corresponding to the positioning reference signal is greater than or equal to the minimum number of symbols of the positioning reference signal, and the frequency domain resource element index corresponding to a same orthogonal cover code is determined by the resource element offset of the same symbol and the frequency domain length of the orthogonal cover code.

As an example, in a case where the type of the orthogonal cover code is time-frequency domain orthogonal cover code, the minimum number of symbols of the positioning reference signal is determined based on the product of the value of the comb and the time domain length of the orthogonal cover code, and resource element offsets and/or frequency domain resource element indexes corresponding to symbols corresponding to the positioning reference signal are determined.

As an example, in the present disclosure, the minimum number of combined slots may be determined based on the minimum number of symbols of the positioning reference signal, where the number of combined slots may be an up rounded result of dividing the product of the value of the comb and the time domain length of the orthogonal cover code by L, where L is a positive integer and is the number of symbols occupied by the positioning reference signal in one slot. For example, L is an integer from 2 to 12.

The frequency domain resource element index of a same orthogonal cover code may be an index corresponding to M consecutive REs starting with the resource element offset of the same symbol. For example, if the source element offset of an $i^{th}$ symbol is k', the frequency domain sub-carriers are M consecutive REs starting with k', i.e., M REs corresponding to k', k'+1, k'+M−1. M is the frequency domain length of the OCC.

In an embodiment, the determining, based on the value of the comb and the feature of the orthogonal cover code, a resource element offset corresponding to each symbol corresponding to the positioning reference signal includes:

the resource element offset corresponding to each symbol corresponding to the positioning reference signal is successively $$(k_1')_L, (k_2')_L, \ldots, (k_K')_L \text{ or } (k_1', k_2', \ldots, k_K')_L, \text{ where } k_1', k_2', \ldots, k_K'$$

are integers from 0 to K−1 and different from each other, K is the value of the comb, L is the length of the orthogonal cover code, and $(*)_L$ means that the content in the bracket is repeated for L times.

In the present disclosure, one OCC acts on the symbols with the same resource offset. For example, for $$(k_1')_L, (k_2')_L, \ldots, (k_K')_L, (k_i')_L = (k_1', k_2', \ldots, k_K')_L$$

corresponds to one OCC code, where i=1, . . . , K; while for $$(k_1', k_2', \ldots, k_K')_L,$$

L symbols with the same resource element offset $k_i'$ on every K symbols correspond to one OCC. If the OCC of the positioning reference signal also corresponds to the dimensionality of the frequency domain, that is, the length of the frequency domain OCC is M, the resource element offset on each symbol further includes M resource elements starting with the resource element offset corresponding to the symbol, i.e., M REs corresponding to k', k'+1, . . . , k'+M−1. M is the frequency domain length of the OCC.

One example is a downlink PRS, where the pattern of the PRS occupies an $l^{th}$ symbol and a $k^{th}$ sub-carrier, where:

$$k = mK_{comb}^{PRS} + \left(\left(k_{offset}^{PRS} + k'\right) \bmod k_{comb}^{PRS}\right)$$

$$l = l_{start}^{PRS}, l_{start}^{PRS} + 1, \ldots, l_{start}^{PRS} + L_{PRS} - 1.$$

Here, m is equal to 0, 1, 2, 3 or other integers;

$$K_{comb}^{PRS}$$

represents the value of the comb;

$$k_{offset}^{PRS} \in \{0, 1, \ldots, K_{comb}^{PRS} - 1\}$$

represents a first frequency domain offset of the PRS resource of a base station configured at a higher layer; k' represents the resource element offset in the present disclosure; l represents the symbols occupied by the slot where the PRS is located;

$$l_{start}^{PRS}$$

represents the first symbol of the slot where the PRS resource is located; and, $L_{PRS}$ is the length of the symbols of the PRS resource.

Table 1 shows the resource element offsets corresponding to a $$\left(l - l_{start}^{PRS}\right)^{th}$$

symbol when the OCC has a length of 2. Table 2 shows the resource element offsets corresponding to the $$l - l_{start}^{PRS}\Big)^{th}$$

symbol when the OCC has a length of 2 and is in a second slot. Table 3 shows the resource element offsets corresponding to the $$\left(l - l_{start}^{PRS}\right)^{th}$$

symbol when the OCC has a length of 4. Table 4 shows the resource element offsets corresponding to the $$\left(l - l_{start}^{PRS}\right)^{th}$$

symbol when the OCC has a length of 4 and is in the second slot. In the case of the downlink PRS, the resource element offsets when the OCC has a length of 2 are shown in Tables 1 and 2, that is, the relative indexes of the symbols corresponding to the PRS resource are frequency domain offsets of $$l - l_{start}^{PRS}.$$

TABLE 1

Resource element offsets corresponding to the $\left(l - l_{start}^{PRS}\right)^{th}$ symbol when the OCC has a length of 2

| $K_{comb}^{PRS}$ | Relative symbol indexes $l - l_{start}^{PRS}$ of downlink $PRS$ resources | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 2 | 0 | 0 | 1 | 1 | 0 | 0 | 1 | 1 | 0 | 0 | 1 | 1 |
| 4 | 0 | 0 | 2 | 2 | 1 | 1 | 3 | 3 | 0 | 0 | 2 | 2 |
| 6 | 0 | 0 | 3 | 3 | 1 | 1 | 4 | 4 | 2 | 2 | 5 | 5 |
| 12 | 0 | 0 | 6 | 6 | 3 | 3 | 9 | 9 | 1 | 1 | 7 | 7 |

When two slots are needed, the frequency domain offsets of different symbols in the second slot are as follows:

TABLE 2

Resource element offsets corresponding to the $\left(l - l_{start}^{PRS}\right)^{th}$ symbol when the OCC has a length of 2 and is in the second slot

| $K_{comb}^{PRS}$ | Relative symbol indexes $l - l_{start}^{PRS}$ of downlink $PRS$ resources | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 2 | 0 | 0 | 1 | 1 | 0 | 0 | 1 | 1 | 0 | 0 | 1 | 1 |
| 4 | 1 | 1 | 3 | 3 | 0 | 0 | 2 | 2 | 1 | 1 | 3 | 3 |
| 6 | 0 | 0 | 3 | 3 | 1 | 1 | 4 | 4 | 2 | 2 | 5 | 5 |
| 12 | 4 | 4 | 10 | 10 | 2 | 2 | 8 | 8 | 5 | 5 | 11 | 11 |

However, one resource element when the OCC has a length of 4 is shown in Tables 3 and 4.

TABLE 3

Resource element offsets corresponding to the $\left(l - l_{start}^{PRS}\right)^{th}$ symbol when the OCC has a length of 4

| $K_{comb}^{PRS}$ | Relative symbol indexes $l - l_{start}^{PRS}$ of downlink $PRS$ resources | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 2 | 0 | 0 | 0 | 0 | 1 | 1 | 1 | 1 | 0 | 0 | 0 | 0 |
| 4 | 0 | 0 | 0 | 0 | 2 | 2 | 2 | 2 | 1 | 1 | 1 | 1 |
| 6 | 0 | 0 | 0 | 0 | 3 | 3 | 3 | 3 | 1 | 1 | 1 | 1 |

When two slots are needed, the frequency domain offsets of different symbols in the second slot are as follows:

TABLE 4

Resource element offsets corresponding to the $\left(l - l_{start}^{PRS}\right)^{th}$ symbol when the OCC has a length of 4 and is in the second slot

| $K_{comb}^{PRS}$ | Relative symbol indexes $l - l_{start}^{PRS}$ of downlink $PRS$ resources | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 2 | 1 | 1 | 1 | 1 | 0 | 0 | 0 | 0 | 1 | 1 | 1 | 1 |
| 4 | 3 | 3 | 3 | 3 | 0 | 0 | 0 | 0 | 2 | 2 | 2 | 2 |
| 6 | 4 | 4 | 4 | 4 | 2 | 2 | 2 | 2 | 5 | 5 | 5 | 5 |

One example is an uplink positioning reference signal SRS, and the pattern of the positioning reference signal SRS occupies a $$\left(k_0^{(p_i)}\right)^{th}$$

sub-carrier of the $1^{th}$ symbol, where $$k_0^{(p_i)} = \bar{k}_0^{(p_i)} + K_{SRS} \cdot \bar{k}_0^{(p_i)} = n_{shift} N_{SC}^{RB} + \left(k_{TC}^{(p_i)} + k_{offset}^{l}\right)$$

represents the set of REs of SRS resources on a sub-band where the SRS resource is located; $K_{SRS}$ represents a starting RE index of the sub-band where the SRS resource is located; $n_{shift}$ represents a frequency domain translation or value of a higher-layer signaling freqDomainShift configuration;

$$N_{SC}^{RB}$$

represents the number of sub-carriers in a physical resource block and is generally 12; and, $$k_{TC}^{(p_i)} = \bar{k}_{TC} \text{ or } k_{TC}^{(p_i)} = \left(\bar{k}_{TC} + K_{TC}/2\right) \bmod K_{TC},$$

where $\bar{k}_{TC} \in \{0, 1, \ldots, K_{TC}-1\}$, $K_{TC}$ is the value of the comb, and $$k^l_{offset}$$

is the resource element offset.

Table 5 shows the resource element offsets $$k^l_{offet}$$

under different $K_{TC}$ and l' when the OCC has a length of 2. As shown in Table 5, $$K^{PRS}_{comb}$$

is the value of the comb, the OCC has a length of 2, and the index of the symbol corresponding to the SRS resource is l'.

TABLE 5

Resource element offsets $k^l_{offset}$ under different $K_{TC}$ and $l'$ when the OCC has a length of 2

| $K_{TC}$ | N = 4 | N = 8 | N = 12 | N = 16 |
|---|---|---|---|---|
| 2 | 0, 0, 1, 1 | 0, 0, 1, 1, 0, 0, 1, 1 | 0, 0, 1, 1, 0, 0, 1, 1, 0, 0, 1, 1 | — |
| 4 | — | 0, 0, 2, 2, 1, 1, 3, 3 | 0, 0, 2, 2, 1, 1, 3, 3, 0, 0, 2, 2 | 0, 0, 2, 2, 1, 1, 3, 3, 0, 0,2, 2, 1, 1, 3, 3 |
| 8 | — | — | — | 0, 0, 4, 4, 2, 2, 6, 6, 1, 1,5, 5, 3, 3, 7, 7 |

Table 6 shows the resource element offsets $$k^l_{offet}$$

under different $K_{TC}$ and l' when the OCC has a length of 4. When OCC=4, the corresponding frequency domain offsets are shown in Table 6.

TABLE 6

Resource element offsets $k^l_{offset}$ under different $K_{TC}$ and $l'$ when the OCC has a length of 4

| $K_{TC}$ | N = 8 | N = 16 |
|---|---|---|
| 2 | 0, 0, 0, 0, 1, 1, 1, 1 | — |
| 4 | — | 0, 0, 0, 0, 2, 2, 2, 2, 1, 1, 1, 1, 3, 3, 3, 3 |

N represents the number of symbols corresponding to the SRS resource. When N is greater than 14, it indicates that there are at least two slots.

In the following embodiments, the resource element offset corresponding to each symbol corresponding to the positioning reference signal is k1, k2, . . . , $k_J$. The resource offset corresponding to the $i^{th}$ symbol of the positioning reference signal is $k_i$, where i=1, . . . , J, and J is the number of symbols corresponding to the positioning reference signal.

In an embodiment, the determining a pattern of the positioning reference signal based on the comb and the orthogonal cover code includes at least one of the following:

in the case of the time domain length of the orthogonal cover code being 2 and the value of the comb being 2, the resource element offset corresponding to each symbol corresponding to the positioning reference signal is successively 0, 0, 1, 1; in the case of the time domain length of the orthogonal cover code being 2 and the value of the comb being 4, the resource element offset corresponding to each symbol corresponding to the positioning reference signal is successively 0, 0, 2, 2, 1, 1, 3, 3; in the case of the time domain length of the orthogonal cover code being 2 and the value of the comb being 6, the resource element offset corresponding to each symbol corresponding to the positioning reference signal is successively 0, 0, 3, 3, 1, 1, 4, 4, 2, 2, 5, 5; in the case of the time domain length of the orthogonal cover code being 2 and the value of the comb being 8, the resource element offset corresponding to each symbol corresponding to the positioning reference signal is successively 0, 0, 4, 4, 2, 2, 6, 6, 1, 1, 5, 5, 3, 3, 7, 7, the number of slots to be combined by the positioning reference signal being 2; and, in the case of the time domain length of the orthogonal cover code being 2 and the value of the comb being 12, the resource element offset corresponding to each symbol corresponding to the positioning reference signal is successively 0, 0, 6, 6, 3, 3, 9, 9, 1, 1, 7, 7, 4, 4, 10, 10, 2, 2, 8, 8, 5, 5, 11, 11, where the number of slots to be combined by the positioning reference signal is 2.

In the embodiment, the type of the orthogonal cover code may be time domain orthogonal cover code, and the time domain interval of the orthogonal cover code may be 1. The time domain interval of the orthogonal cover code being 1 may be alternatively expressed as the orthogonal cover code being consecutive.

In an embodiment, the determining a pattern of the positioning reference signal based on the comb and the orthogonal cover code includes one of the following:

in the case of the time domain length of the orthogonal cover code being 4 and the value of the comb being 2, the resource element offset corresponding to each symbol corresponding to the positioning reference signal is successively 0, 0, 0, 0, 1, 1, 1, 1; in the case of the time domain length of the orthogonal cover code being 4 and the value of the comb being 4, the resource element offset corresponding to each symbol corresponding to the positioning reference signal is successively 0, 0, 0, 0, 2, 2, 2, 2, 1, 1, 1, 1, 3, 3, 3, 3; and, in the case of the time domain length of the orthogonal cover code being 4 and the value of the comb being 6, the resource element offset corresponding to each symbol corresponding to the positioning reference signal is successively 0, 0, 0, 0, 3, 3, 3, 3, 1, 1, 1, 1, 4, 4, 4, 4, 2, 2, 2, 2, 5, 5, 5, 5.

In this embodiment, the type of the orthogonal cover code may be time domain orthogonal cover code, and the time domain interval of the orthogonal cover code may be 1.

In an embodiment, the determining a pattern of the positioning reference signal based on the comb and the orthogonal cover code includes one of the following:

in the case of the time domain length of the orthogonal cover code being 2 and the value of the comb being 2, the resource element offset corresponding to each symbol corresponding to the positioning reference signal is successively 0, 1, 0, 1; in the case of the time domain length of the orthogonal cover code being 2 and the value of the comb being 4, the resource element offset corresponding to each symbol corresponding to the positioning reference signal is successively 0, 2, 1, 3, 0, 2, 1, 3; in the case of the time domain length of the orthogonal cover code being 2 and the value of the comb being 6, the resource element offset corresponding to each symbol corresponding to the positioning reference signal is successively 0, 3, 1, 4, 2, 5, 0, 3, 1, 4, 2, 5; in the case of the time domain length of the orthogonal cover code being 2 and the value of the comb being 8, the resource element offset corresponding to each symbol corresponding to the positioning reference signal is successively 0, 4, 2, 6, 1, 5, 3, 7, 0, 4, 2, 6, 1, 5, 3, 7; and, in the case of the time domain length of the orthogonal cover code being 2 and the value of the comb being 12, the resource element offset corresponding to each symbol corresponding to the positioning reference signal is successively 0, 6, 3, 9, 1, 7, 4, 10, 2, 8, 5, 11, 0, 6, 3, 9, 1, 7, 4, 10, 2, 8, 5, 11.

In the embodiment, the type of the orthogonal cover code is time domain orthogonal cover code, and the time domain interval of the orthogonal cover code is greater than or equal to the time domain length of the orthogonal cover code.

In an embodiment, the determining a pattern of the positioning reference signal based on the comb and the orthogonal cover code includes at least one of the following:

in the case of the time domain length of the orthogonal cover code being 4 and the value of the comb being 2, the resource element offset corresponding to each symbol corresponding to the positioning reference signal is successively 0, 1, 0, 1, 0, 1, 0, 1; in the case of the time domain length of the orthogonal cover code being 4 and the value of the comb being 4, the resource element offset corresponding to each symbol corresponding to the positioning reference signal is successively 0, 2, 1, 3, 0, 2, 1, 3, 0, 2, 1, 3, 0, 2, 1, 3; and, in the case of the time domain length of the orthogonal cover code being 4 and the value of the comb being 6, the resource element offset corresponding to each symbol corresponding to the positioning reference signal is successively 0, 3, 1, 4, 2, 5, 0, 3, 1, 4, 2, 5, 0, 3, 1, 4, 2, 5, 0, 3, 1, 4, 2, 5.

In the embodiment, the type of the orthogonal cover code may be time domain orthogonal cover code, and the time domain interval of the orthogonal cover code is greater than or equal to the time domain length of the orthogonal cover code. The time domain interval of the orthogonal cover code being greater than or equal to the time domain length of the orthogonal cover code may be alternatively expressed as the orthogonal cover code being non-consecutiveness.

In an embodiment, the determining a pattern of the positioning reference signal based on the comb and the orthogonal cover code includes at least one of the following:

in the case of the frequency domain length of the orthogonal cover code being 2 and the value of the comb being 2, the resource element offset corresponding to each symbol corresponding to the positioning reference signal is successively 0, 2; and, in the case of the frequency domain length of the orthogonal cover code being 2 and the value of the comb being 4, the resource element offset corresponding to each symbol corresponding to the positioning reference signal is successively 0, 4, 2.

In the embodiment, the type of the orthogonal cover code may be frequency domain orthogonal cover code.

In an embodiment, the determining a pattern of the positioning reference signal based on the comb and the orthogonal cover code includes at least one of the following:

in the case of the time domain length of the orthogonal cover code being 2 and the value of the comb being 2, the resource element offset corresponding to each symbol corresponding to the positioning reference signal is successively 0, 0, 2, 2; and, in the case of the type of the orthogonal cover code being a time domain orthogonal cover code, the time domain length of the orthogonal cover code being 2 and the value of the comb being 4, the resource element offset corresponding to each symbol corresponding to the positioning reference signal is successively 0, 0, 4, 4, 2, 2.

In the embodiment, the type of the orthogonal cover code may be time-frequency domain orthogonal cover code.

In an embodiment, the frequency domain resource element index of the $i^{th}$ symbol is an index corresponding to M consecutive resource elements starting with the resource element offset on a $k^{th}$ symbol, where i and M are positive integers and M is the frequency domain length of the orthogonal cover code.

The present disclosure will be illustrated below.

The determination method provided in the present disclosure may be regarded as a method for configuring a positioning reference signal, for example, configuring a pattern of a positioning reference signal.

Positioning is a common application in various wireless communication systems. However, due to the use of a plurality of base stations in positioning, the pilot overhead is relatively high, and the signal to interference plus noise ratio (SINR) of non-serving cells is generally low. In order to estimate the pilot of non-serving cells, the muting technology is needed, resulting in an increase in the pilot overhead. In order to realize positioning without increasing the pilot overhead, some new pilot patterns need to be designed.

Figure 1A:
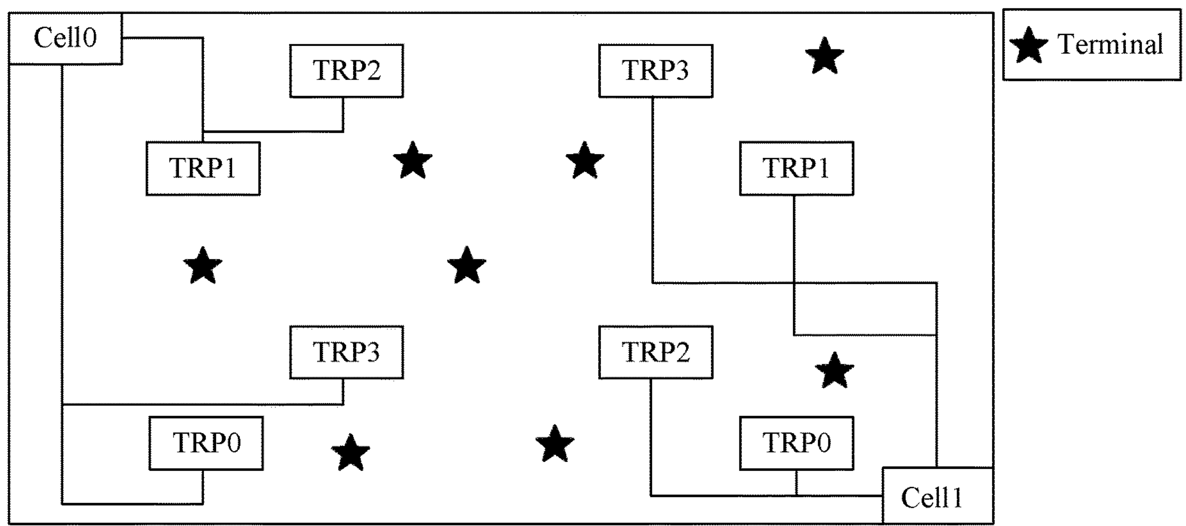
FIG. 1*a* is a schematic diagram of a positioning scenario according to an embodiment of the present disclosure.

FIG. 1*a* is a schematic diagram of a positioning scenario according to an embodiment of the present disclosure. With reference to FIG. 1*a*, there may be a small number of indoor base stations and a large number of transmission reception points (TRPs), and the single frequency networks (SFNs) of all TRPs in a same base station are identical. During high-frequency beam scanning, to avoid interference, the downlink PRS is much likely to be mute. The downlink PRS of a specific TRP has a large time domain period, thereby affecting the positioning accuracy. There are a large number of UEs to be served by each TRP, and the uplink PRS transmitted to each TRP may lead to interference, so that the multiplexing capability of the uplink PRS needs to be enhanced.

Figure 1B:
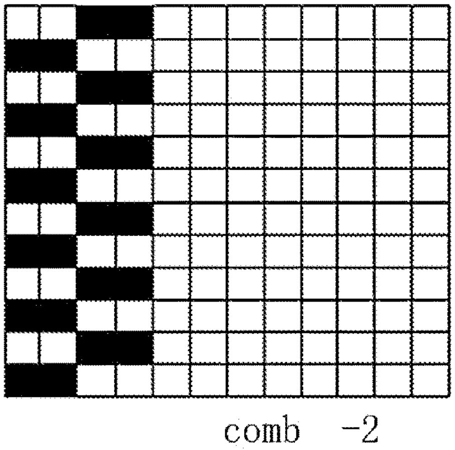
FIG. 1*b* is a schematic diagram of a positioning reference signal pattern according to an embodiment of the present disclosure.
Figure 1C:
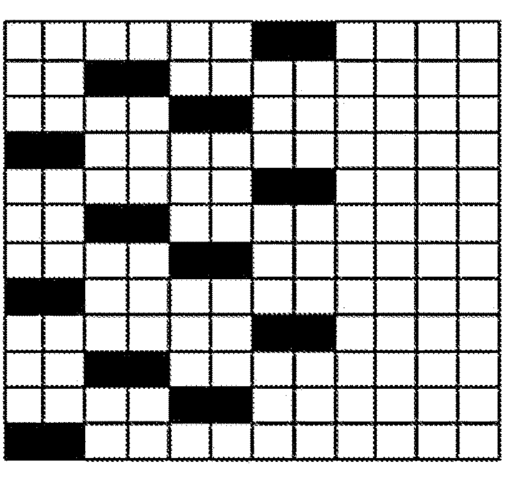
FIG. 1*c* is a schematic diagram of another positioning reference signal pattern according to an embodiment of the present disclosure.
Figure 1D:
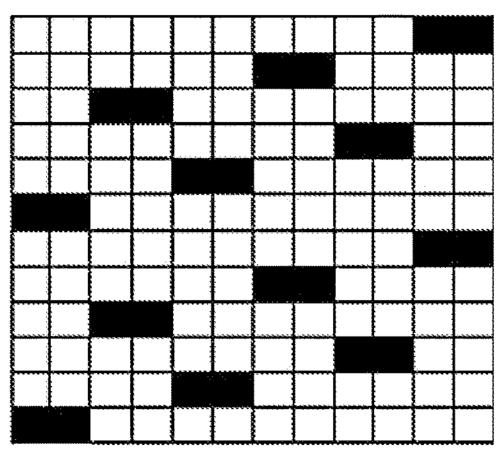
FIG. 1*d* is a schematic diagram of still another positioning reference signal pattern according to an embodiment of the present disclosure.
Figure 1E:
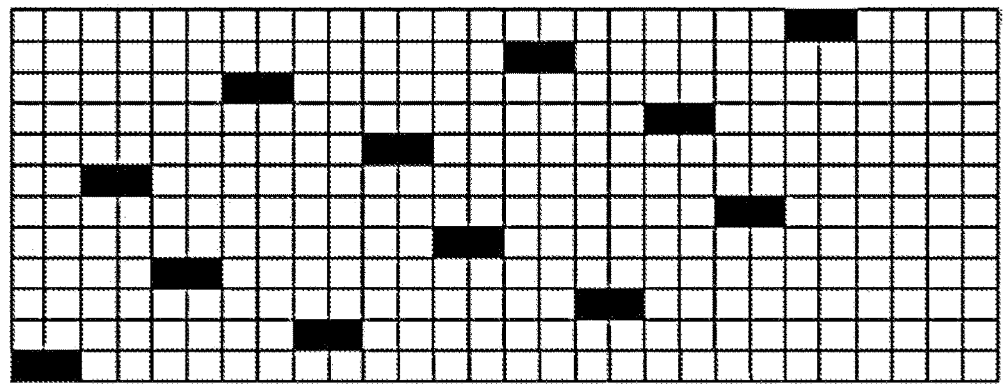
FIG. 1*e* is a schematic diagram of yet another positioning reference signal pattern according to an embodiment of the present disclosure.

FIG. 1B is a schematic diagram of a positioning reference signal pattern according to an embodiment of the present disclosure; FIG. 1*c* is a schematic diagram of another positioning reference signal pattern according to an embodiment of the present disclosure; FIG. 1*d* is a schematic diagram of still another positioning reference signal pattern according to an embodiment of the present disclosure; and, FIG. 1*e* is a schematic diagram of yet another positioning reference signal pattern according to an embodiment of the present disclosure. In FIGS. 1*b*-1*e*, the horizontal axis may represent the time domain, and the vertical axis may represent the frequency domain. The same is true for the following pattern diagrams in the present disclosure, that is, the horizontal axis represents the time domain and the vertical axis represents the frequency domain. With reference to FIGS. 1*b*-1*e*, in a case where the orthogonal cover code is a time domain-orthogonal cover code (TD-OCC) and the OCC is consecutive and has a time domain length of 2, if the value of Comb is 2 (i.e., Comb-2), the resource element offset corresponding to each symbol corresponding to the positioning reference signal is successively (0, 0, 1, 1); if the value of Comb is 4 (i.e., Comb-4), the resource element offset corresponding to each symbol corresponding to the positioning reference signal is successively (0, 0, 2, 2, 1, 1, 3, 3); if the value of Comb is 6 (i.e., Comb-6), the resource element offset corresponding to each symbol corresponding to the positioning reference signal is successively (0, 0, 3, 3, 1, 1, 4, 4, 2, 2, 5, 5); if the value of Comb is 8 (i.e., Comb-8), two slots are combined, and the resource element offset corresponding to each symbol corresponding to the positioning reference signal is successively (0, 0, 4, 4, 2, 2, 6, 6, 1, 1, 5, 5, 3, 3, 7, 7); and, if the value of Comb is 12 (i.e., Comb-12), two slots are combined, and the resource element offset corresponding to each symbol corresponding to the positioning reference signal is successively (0, 0, 6, 6, 3, 3, 9, 9, 1, 1, 7, 7, 4, 4, 10, 10, 2, 2, 8, 8, 5, 5, 11, 11).

Figure 1F:
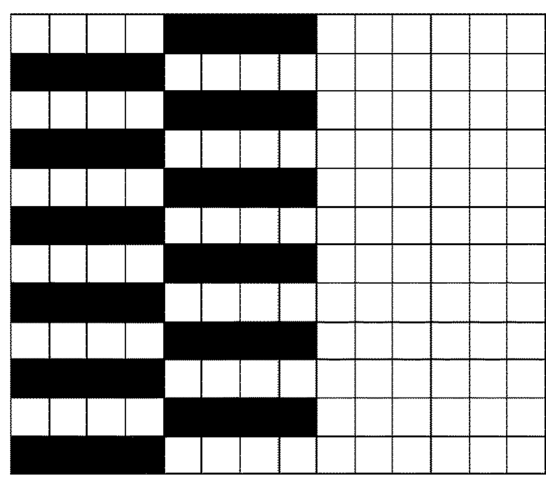
FIG. 1*f* is a schematic diagram of yet another positioning reference signal pattern according to an embodiment of the present disclosure.

FIG. 1*f* is a schematic diagram of yet another positioning reference signal pattern according to an embodiment of the present disclosure. With reference to FIG. 1*f*, in a case where the orthogonal cover code is a TD-OCC and the OCC is consecutive and has a time domain length of 4, if the value of Comb is 2 (i.e., Comb-2), the resource element offset corresponding to each symbol corresponding to the positioning reference signal is successively (0, 0, 0, 0, 1, 1, 1, 1).

In addition, if the value of Comb is 4 (i.e., Comb-4), two slots are combined, and the resource element offset corresponding to each symbol corresponding to the positioning reference signal is successively (0, 0, 0, 0, 2, 2, 2, 2, 1, 1, 1, 1, 3, 3, 3, 3); and, if the value of Comb is 6 (i.e., Comb-6), two slots are combined, and the resource element offset corresponding to each symbol corresponding to the positioning reference signal is successively (0, 0, 0, 0, 3, 3, 3, 3, 1, 1, 1, 1, 4, 4, 4, 4, 2, 2, 2, 2, 5, 5, 5, 5).

Figure 1G:
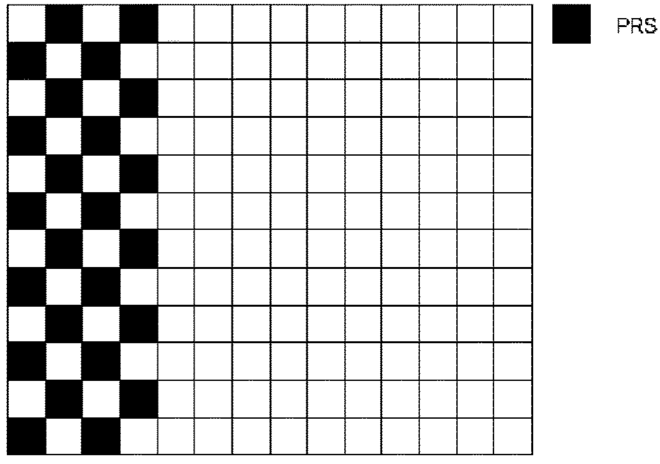
FIG. 1*g* is a schematic diagram of yet another positioning reference signal pattern according to an embodiment of the present disclosure.
Figure 1H:
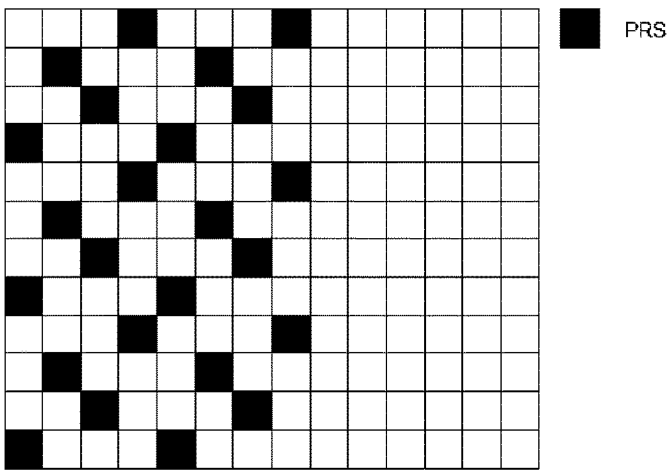
FIG. 1*h* is a schematic diagram of yet another positioning reference signal pattern according to an embodiment of the present disclosure.

FIG. 1*g* is a schematic diagram of yet another positioning reference signal pattern according to an embodiment of the present disclosure, and FIG. 1*h* is a schematic diagram of yet another positioning reference signal pattern according to an embodiment of the present disclosure. FIG. 1*g* shows an example of Comb-2, and FIG. 1*h* shows an example of Comb-4. In a case where the orthogonal cover code is a TD-OCC and the OCC is non-consecutive and has a time domain length of 2, if the value of Comb is 2 (i.e., Comb-2), the resource element offset corresponding to each symbol corresponding to the positioning reference signal is successively (0, 1, 0, 1); and, if the value of Comb is 4 (i.e., Comb-4), the resource element offset corresponding to each symbol corresponding to the positioning reference signal is successively (0, 2, 1, 3, 0, 2, 1, 3). In addition, if the value of Comb is 6 (i.e., Comb-6), the resource element offset corresponding to each symbol corresponding to the positioning reference signal is successively (0, 3, 1, 4, 2, 5, 0, 3, 1, 4, 2, 5); if the value of Comb is 8 (i.e., Comb-8), two slots are combined, and the resource element offset corresponding to each symbol corresponding to the positioning reference signal is successively (0, 4, 2, 6, 1, 5, 3, 7, 0, 4, 2, 6, 1, 5, 3, 7); and, if the value of Comb is 12 (i.e., Comb-12), two slots are combined, and the resource element offset corresponding to each symbol corresponding to the positioning reference signal is successively (0, 6, 3, 9, 1, 7, 4, 10, 2, 8, 5, 11, 0, 6, 3, 9, 1, 7, 4, 10, 2, 8, 5, 11).

Figure 1I:
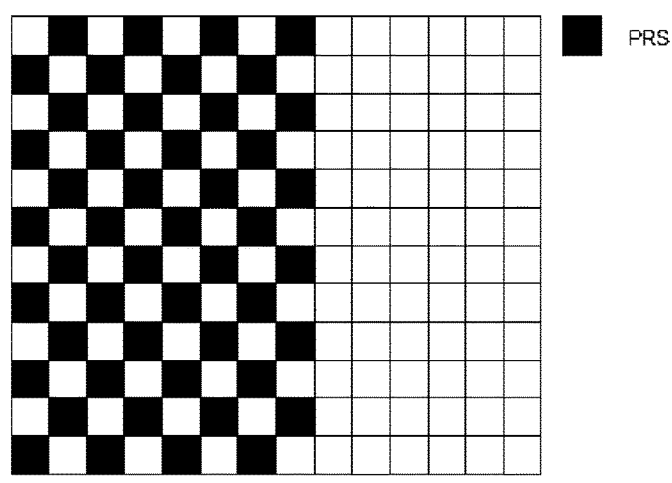
FIG. 1*i* is a schematic diagram of yet another positioning reference signal pattern according to an embodiment of the present disclosure.

FIG. 1*i* is a schematic diagram of yet another positioning reference signal pattern according to an embodiment of the present disclosure. With reference to FIG. 1*i*, in a case where the orthogonal cover code is a TD-OCC and the OCC is non-consecutive and has a time domain length of 4, if the value of Comb is 2 (i.e., Comb-2), the resource element offset corresponding to each symbol corresponding to the positioning reference signal is successively (0, 1, 0, 1, 0, 1, 0, 1). In addition, if the value of Comb is 4 (i.e., Comb-4), two slots are combined, and the resource element offset corresponding to each symbol corresponding to the positioning reference signal is successively (0, 2, 1, 3, 0, 2, 1, 3, 0, 2, 1, 3, 0, 2, 1, 3); and, if the value of Comb is 6 (i.e., Comb-6), two slots are combined, and the resource element offset corresponding to each symbol corresponding to the positioning reference signal is successively (0, 3, 1, 4, 2, 5, 0, 3, 1, 4, 2, 5, 0, 3, 1, 4, 2, 5, 0, 3, 1, 4, 2, 5).

Figure 1J:
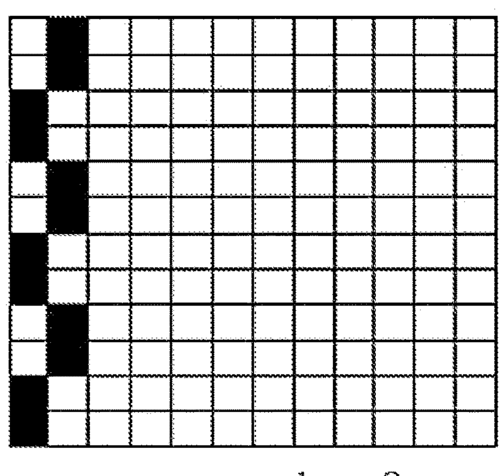
FIG. 1*j* is a schematic diagram of yet another positioning reference signal pattern according to an embodiment of the present disclosure.
Figure 1K:
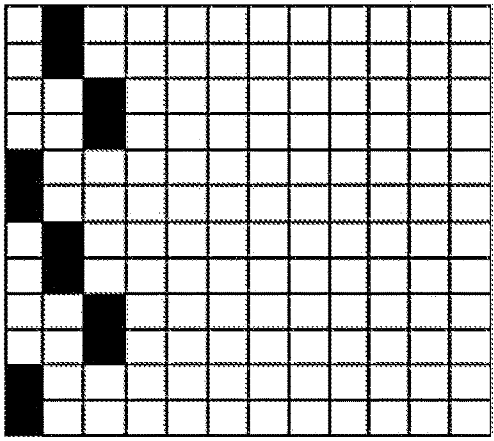
FIG. 1*k* is a schematic diagram of yet another positioning reference signal pattern according to an embodiment of the present disclosure.

FIG. 1*j* is a schematic diagram of yet another positioning reference signal pattern according to an embodiment of the present disclosure, and FIG. 1*k* is a schematic diagram of yet another positioning reference signal pattern according to an embodiment of the present disclosure. FIG. 1*j* shows an example of Comb-2, and FIG. 1*k* shows an example of Comb-4. In a case where the orthogonal cover code is a frequency domain-orthogonal cover code (FD-OCC) and the OCC has a frequency domain length of 2, if the value of Comb is 2 (i.e., Comb-2), the resource element offset corresponding to each symbol corresponding to the positioning reference signal is successively {0, 2}; and, if the value of Comb is 4 (i.e., Comb-4), the resource element offset corresponding to each symbol corresponding to the positioning reference signal is successively {0, 4, 2}.

Figure 1L:
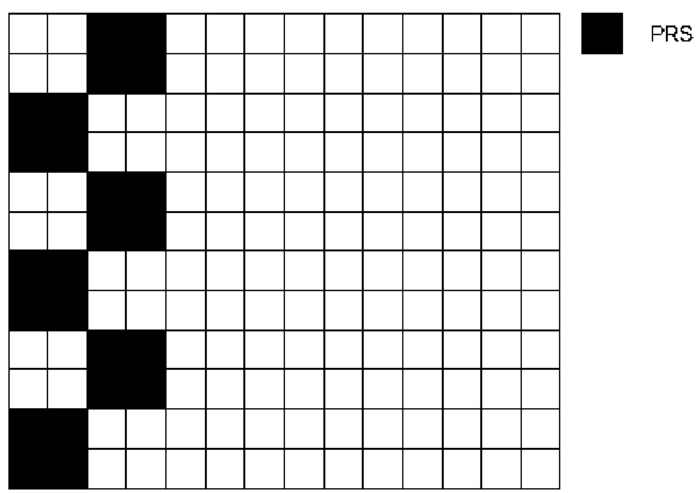
FIG. 1*l* is a schematic diagram of yet another positioning reference signal pattern according to an embodiment of the present disclosure.
Figure 1M:
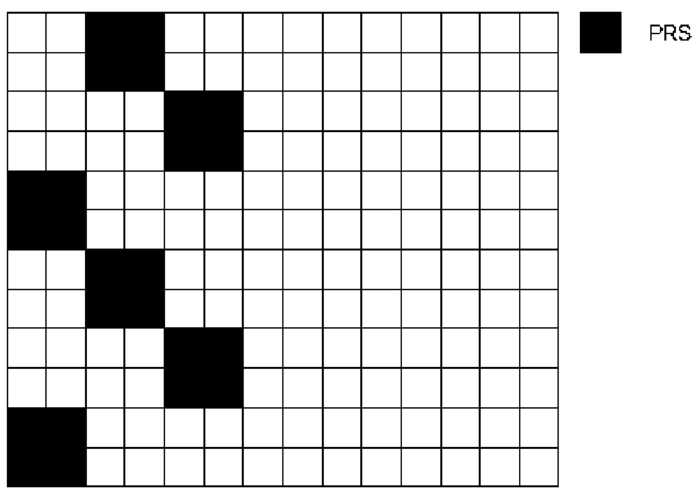
FIG. 1*m* is a schematic diagram of still another positioning reference signal pattern according to an embodiment of the present disclosure.

FIG. 1*l* is a schematic diagram of yet another positioning reference signal pattern according to an embodiment of the present disclosure, and FIG. 1*m* is a schematic diagram of still another positioning reference signal pattern according to an embodiment of the present disclosure. FIG. 1*l* shows an example of Comb-2, and FIG. 1*m* shows an example of Comb-4. In a case where the orthogonal cover code is a time-frequency domain orthogonal cover code and the OCC has a time domain length of 2, if the value of Comb is 2 (i.e., Comb-2), the resource element offset corresponding to each symbol corresponding to the positioning reference signal is successively {0, 0, 2, 2}; and, if the value of Comb is 4 (i.e., Comb-4), the resource element offset corresponding to each symbol corresponding to the positioning reference signal is successively {0, 0, 4, 4, 2, 2}.

In accordance with the determination method provided in the present disclosure, for a frequency range 1 (FR1), downlink PRS muting can be reduced or is not applicable. For FR2, unless the UE has the ability to receive a plurality of beams at the same moment, downlink PRS muting is needed. The frequency range of FR1 may be 450 MHz to 6000 MHz, and the frequency range of FR2 may be 24250 MHz to 52600 MHz. The time domain OCC can improve the received power. For example, when the total transmitted power is constant, the received power of each UE in Comb-2 can be identical to the received power in the Comb-2 scheme of the 16 version.

Figure 2:
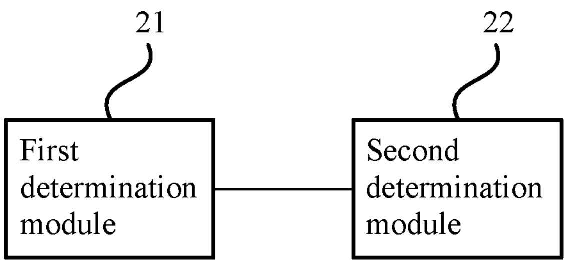
FIG. 2 is a schematic structural diagram of a determination apparatus according to an embodiment of the present disclosure.

In an example embodiment, the present disclosure further provides a determination apparatus. FIG. 2 is a schematic structural diagram of the determination apparatus according to the embodiment of the present disclosure. The determination apparatus provided in the embodiment of the present disclosure may be integrated on a communication node. As shown in FIG. 2, the apparatus includes: a first determination module 21 configured to determine a comb and an orthogonal cover code of a positioning reference signal; and, a second determination module 22 configured to determine a pattern of the positioning reference signal based on the comb and the orthogonal cover code.

The determination apparatus provided in the embodiment is configured to implement the determination method according to the embodiments of the present disclosure, and the implementation principle and technical effects of the determination apparatus provided in the embodiment are similar to those of the determination method according to the embodiments of the present disclosure and will not be repeated here.

Based on the above embodiment, a variant embodiment of the above embodiments is provided. For simplicity of description, only differences from the above embodiments will be described in the variant embodiment.

In an embodiment, the second determination module 22 is configured to: determine, based on the value of the comb and the feature of the orthogonal cover code, a resource element offset corresponding to each symbol corresponding to the positioning reference signal.

In an embodiment, the feature of the orthogonal cover code includes one or more of a type, a time domain length, a time domain interval, and a frequency domain length; and, the type includes one or more of a time domain orthogonal cover code, a frequency domain orthogonal cover code, and a time-frequency domain orthogonal cover code.

In an embodiment, the resource element offset corresponding to each symbol corresponding to the positioning reference signal is successively $$(k'_1)_L, (k'_2)_L, \ldots, (k'_K)_L \text{ or } (k'_1, k'_2, \ldots, k'_K)_L, \text{ where } k'_1, k'_2, \ldots, k'_K$$

are integers from 0 to K−1 and different from each other, K is the value of the comb, L is the length of the orthogonal cover code, and $(*)_L$ means that the content in the bracket is repeated for L times.

In an Embodiment, the Second Determination Module 22 is Configured to:

determine the minimum number of symbols of the positioning reference signal based on the product of the value of the comb and the time domain length of the orthogonal cover code, and determine resource element offsets corresponding to symbols corresponding to the positioning reference signal, where the number of symbols corresponding to the positioning reference signal is greater than or equal to the minimum number of symbols of the positioning reference signal, the resource element offsets corresponding to a same orthogonal cover code are identical, and the resource element offsets corresponding to different orthogonal cover codes are different.

In an embodiment, the second determination module 22 is configured to: determine the minimum number of symbols of the positioning reference signal based on the value of the comb, and determine resource element offsets and/or frequency domain resource element indexes corresponding to symbols corresponding to the positioning reference signal, where the number of symbols corresponding to the positioning reference signal is greater than or equal to the minimum number of symbols of the positioning reference signal, the frequency domain resource element index corresponding to a same orthogonal cover code is determined by the resource element offset of the same symbol and the frequency domain length of the orthogonal cover code.

In an Embodiment, the Second Determination Module 22 is Configured to:

determine the minimum number of symbols of the positioning reference signal based on the product of the value of the comb and the time domain length of the orthogonal cover code, and determine resource element offsets and/or frequency domain resource element indexes corresponding to symbols corresponding to the positioning reference signal, where the number of symbols corresponding to the positioning reference signal is greater than or equal to the minimum number of symbols of the positioning reference signal, and the frequency domain resource element index corresponding to a same orthogonal cover code is determined by the resource element offset of the same symbol and the frequency domain length of the orthogonal cover code.

In an embodiment, the second determination module 22 is configured to include at least one of the following:

in the case of the time domain length of the orthogonal cover code being 2 and the value of the comb being 2, the resource element offset corresponding to each symbol corresponding to the positioning reference signal is successively 0, 0, 1, 1; in the case of the time domain length of the orthogonal cover code being 2 and the value of the comb being 4, the resource element offset corresponding to each symbol corresponding to the positioning reference signal is successively 0, 0, 2, 2, 1, 1, 3, 3; in the case of the time domain length of the orthogonal cover code being 2 and the value of the comb being 6, the resource element offset corresponding to each symbol corresponding to the positioning reference signal is successively 0, 0, 3, 3, 1, 1, 4, 4, 2, 2, 5, 5; in the case of the time domain length of the orthogonal cover code being 2 and the value of the comb being 8, the resource element offset corresponding to each symbol corresponding to the positioning reference signal is successively 0, 0, 4, 4, 2, 2, 6, 6, 1, 1, 5, 5, 3, 3, 7, 7, the number of slots to be combined by the positioning reference signal being 2; and, in the case of the time domain length of the orthogonal cover code being 2 and the value of the comb being 12, the resource element offset corresponding to each symbol corresponding to the positioning reference signal is successively 0, 0, 6, 6, 3, 3, 9, 9, 1, 1, 7, 7, 4, 4, 10, 10, 2, 2, 8, 8, 5, 5, 11, 11, the number of slots to be combined by the positioning reference signal being 2.

In an embodiment, the second determination module 22 is configured to include at least one of the following:

in the case of the time domain length of the orthogonal cover code being 4 and the value of the comb being 2, the resource element offset corresponding to each symbol corresponding to the positioning reference signal is successively 0, 0, 0, 0, 1, 1, 1, 1; in the case of the time domain length of the orthogonal cover code being 4 and the value of the comb being 4, the resource element offset corresponding to each symbol corresponding to the positioning reference signal is successively 0, 0, 0, 0, 2, 2, 2, 2, 1, 1, 1, 1, 3, 3, 3, 3; and, in the case of the time domain length of the orthogonal cover code being 4 and the value of the comb being 6, the resource element offset corresponding to each symbol corresponding to the positioning reference signal is successively 0, 0, 0, 0, 3, 3, 3, 3, 1, 1, 1, 1, 4, 4, 4, 4, 2, 2, 2, 2, 5, 5, 5, 5.

In an embodiment, the second determination module 22 is configured to include at least one of the following:

in the case of the time domain length of the orthogonal cover code being 2 and the value of the comb being 2, the resource element offset corresponding to each symbol corresponding to the positioning reference signal is successively 0, 1, 0, 1; in the case of the time domain length of the orthogonal cover code being 2 and the value of the comb being 4, the resource element offset corresponding to each symbol corresponding to the positioning reference signal is successively 0, 2, 1, 3, 0, 2, 1, 3; in the case of the time domain length of the orthogonal cover code being 2 and the value of the comb being 6, the resource element offset corresponding to each symbol corresponding to the positioning reference signal is successively 0, 3, 1, 4, 2, 5, 0, 3, 1, 4, 2, 5; in the case of the time domain length of the orthogonal cover code being 2 and the value of the comb being 8, the resource element offset corresponding to each symbol corresponding to the positioning reference signal is successively 0, 4, 2, 6, 1, 5, 3, 7, 0, 4, 2, 6, 1, 5, 3, 7; and, in the case of the time domain length of the orthogonal cover code being 2 and the value of the comb being 12, the resource element offset corresponding to each symbol corresponding to the positioning reference signal is successively 0, 6, 3, 9, 1, 7, 4, 10, 2, 8, 5, 11, 0, 6, 3, 9, 1, 7, 4, 10, 2, 8, 5, 11.

In an embodiment, the second determination module 22 is configured to include at least one of the following:

in the case of the time domain length of the orthogonal cover code being 4 and the value of the comb being 2, the resource element offset corresponding to each symbol corresponding to the positioning reference signal is successively 0, 1, 0, 1, 0, 1, 0, 1; in the case of the time domain length of the orthogonal cover code being 4 and the value of the comb being 4, the resource element offset corresponding to each symbol corresponding to the positioning reference signal is successively 0, 2, 1, 3, 0, 2, 1, 3, 0, 2, 1, 3, 0, 2, 1, 3; and, in the case of the time domain length of the orthogonal cover code being 4 and the value of the comb being 6, the resource element offset corresponding to each symbol corresponding to the positioning reference signal is successively 0, 3, 1, 4, 2, 5, 0, 3, 1, 4, 2, 5, 0, 3, 1, 4, 2, 5, 0, 3, 1, 4, 2, 5.

In an embodiment, the second determination module 22 is configured to include at least one of the following:

in the case of the frequency domain length of the orthogonal cover code being 2 and the value of the comb being 2, the resource element offset corresponding to each symbol corresponding to the positioning reference signal is successively 0, 2; and, in the case of the frequency domain length of the orthogonal cover code being 2 and the value of the comb being 4, the resource element offset corresponding to each symbol corresponding to the positioning reference signal is successively 0, 4, 2.

In an embodiment, the second determination module 22 is configured to include at least one of the following:

in the case of the time domain length of the orthogonal cover code being 2 and the value of the comb being 2, the resource element offset corresponding to each symbol corresponding to the positioning reference signal is successively 0, 0, 2, 2; and, in the case of the time domain length of the orthogonal cover code being 2 and the value of the comb being 4, the resource element offset corresponding to each symbol corresponding to the positioning reference signal is successively 0, 0, 4, 4, 2, 2.

In an embodiment, the frequency domain resource element index of an $i^{th}$ symbol is an index corresponding to M consecutive resource elements starting with the resource element offset on a $k^{th}$ symbol, where i and M are positive integers and M is the frequency domain length of the orthogonal cover code.

Figure 3:
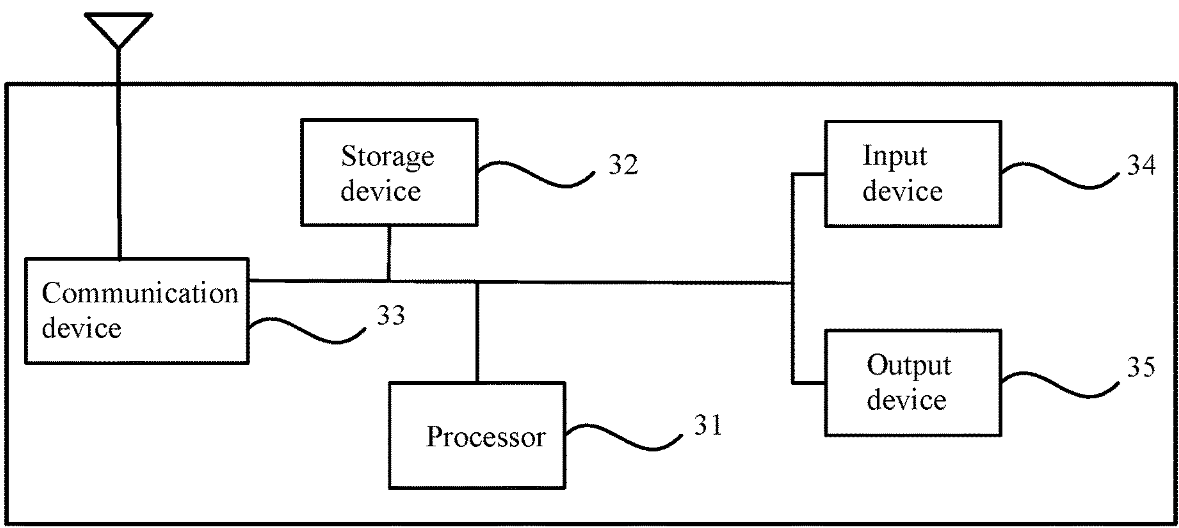
FIG. 3 is a schematic structural diagram of a communication mode according to an embodiment of the present disclosure.

In an example implementation, an embodiment of the present disclosure further provides a communication node. FIG. 3 is a schematic structural diagram of the communication node according to the embodiment of the present disclosure. As shown in FIG. 3, the communication node provided in the present disclosure includes one or more processors 31 and a storage device 32. There may be one or more processor 31 in the communication node, and FIG. 3 is illustrated by taking one processor 31 as an example. The storage device 32 is configured to store one or more programs which, when executed by the one or more processors 31, cause the one or more processors 31 to implement the determination method according to the embodiments of the present disclosure.

The communication node further includes a communication device 33, an input device 34 and an output device 35.

The processor 31, the storage device 32, the communication device 33, the input device 34 and the output device 35 in the communication node may be connected via a bus or in other ways. FIG. 3 is illustrated by taking being connected via a bus as an example.

The input device 34 may be configured to receive input digit or character information and generate a key signal input related to user settings and function control of the communication node. The output device 35 may include a display screen or other display devices.

The communication device 33 may include a receiver and a transmitter. The communication device 33 is configured to perform information transceiving communication according to the control of the processor 31.

As a computer-readable storage medium, the storage device 32 may be configured to store software programs, computer-executable programs and modules, for example, program instructions/modules corresponding to the determination method according to the embodiments of the present disclosure (for example, the first determination module 21 and the second determination module 22 in the determination apparatus). The storage device 32 may include a program storage region and a data storage region. The program storage region may store application programs required by the operating system and at least one function. The data storage region may store data created according to the use of the communication node, etc. In addition, the storage device 32 may include high-speed random access memories, or may include non-volatile memories, for example, at least one magnetic disk memory device, flash memory devices or other non-volatile solid-state memory devices. In some instances, the storage device 32 may include memories remotely arranged relative to the processor 31. These remote memories may be connected to the service node via a network. Examples of the network include, but not limited to, Internet, Intranet, local area networks, mobile communication networks and combinations thereof.

An embodiment of the present disclosure further provides a non-transitory computer readable storage medium storing computer programs which, when executed by a processor, cause the processor to implement the method according to any one of the embodiments of the present disclosure. The non-transitory computer readable storage medium stores computer programs which, when executed by a processor, cause the processor to implement the determination method according to any one of the embodiments of the present disclosure. The method includes steps of: determining a comb and an orthogonal cover code of a positioning reference signal; and, determining a pattern of the positioning reference signal according to the comb and the orthogonal cover code.

The computer storage medium in the embodiment of the present disclosure may be any combination of one or more computer-readable mediums. The computer-readable medium may be computer-readable signal mediums or computer-readable storage mediums. For example, the computer-readable storage medium may be, but not limited to, electrical, magnetic, optical, electromagnetic, infrared or semiconductor systems, apparatuses or devices, or any combination thereof. The examples (non-exhaustive list) of the computer-readable storage medium include: electrical connections having one or more leads, portable computer disks, hard disks, random access memories (RAMs), read only memories (ROMs), erasable programmable read only memories (EPROMs), flash memories, optical fibers, portable CD-ROMs, optical memory devices, magnetic memory devices or any suitable combinations thereof. The computer-readable storage medium may be any tangible medium containing or storing programs. The programs may be instructed to be executed as a system, an apparatus or a device or used with a system, an apparatus or a device.

The computer-readable signal medium may include data signals propagated in basebands or as part of carriers, in which computer-readable program codes are carried. The propagated data signals may be in various forms, including but not limited to: electromagnetic signals, optical signals or any suitable combination thereof. The computer-readable signal medium may also be any computer-readable medium except for computer-readable storage mediums. The computer-readable medium may send, propagate or transmit programs for use by an instruction execution system, apparatus or device or for use with the instruction execution system, apparatus or device.

The program codes contained in the computer-readable medium may be transmitted by any suitable medium, including but not limited to: wireless, wires, optical cables, radial frequency (RF) or the like, or any suitable combination thereof.

The computer program codes for executing the operations in the present disclosure may be written in one or more programming languages or combinations thereof, including object-oriented programming languages such as Java, Smalltalk or C++, and conventional procedural programming languages such as "C" language or similar programming languages. The program codes may be executed entirely on the user's computer, or executed partly on the user's computer, or executed as a stand-alone software package, or executed partly on the user's computer and partly on a remote computer, or executed entirely on a remote computer or server. In a scenario involving the remote computer, the remote computer may be connected to the user's computer through any type of networks, including local area networks (LANs) or wide area networks (WANs), or may be connected to an external computer (for example, through the Internet using an Internet service provider).

The term "terminal device" encompasses any suitable type of wireless user equipment, for example, mobile phones, portable data processing apparatuses, portable web browsers or vehicle-mounted mobile stations.

Generally, various embodiments of the present disclosure may be implemented in hardware or dedicated circuits, software, logics or any combinations thereof. For example, some aspects may be implemented in hardware, while other aspects may be implemented in firmware or software that can be executed by a controller, a microprocessor or other computing apparatuses, although the present disclosure is not limited thereto.

The embodiments of the present disclosure may be implemented by executing computer program instructions by a data processor of a mobile device, for example, in a processor entity, or by hardware, or by a combination of software and hardware. The computer program instructions may be assembly instructions, instruction set architecture (ISA) instructions, machine instructions, machine-related instructions, microcodes, firmware instructions, state setup data, or source codes or target codes written in any combination of one or more programming languages.

The blocks of any logic flow in the accompanying drawings of the present disclosure may represent program steps, or may represent interconnected logic circuits, modules and functions, or may represent combinations of program steps and logic circuits, modules or functions. The computer programs may be stored on a memory. The memory may be of any type suitable for the local technical environment and may be implemented by any suitable data storage technology, for example, but not limited to, read-only memories (ROMs), random access memories (RAMs), optical memory devices and systems (digital video discs (DVDs) or compact disks (CDs)), etc. The computer-readable medium may include non-transient storage mediums. The data processor may be of any type suitable for the local technical environment, for example, but not limited to, general purpose computers, special purpose computers, microprocessors, digital signal processors (DSPs), application specific integrated circuits (ASICs), field-programmable gate arrays (FGPAs), and processors based on a multicore processor architecture.

What is claimed is:

1. A determination method, comprising:

determining a comb and an orthogonal cover code of a positioning reference signal; and determining, based on a value of the comb and a feature of the orthogonal cover code, a resource element offset corresponding to each symbol corresponding to the positioning reference signal;

wherein the resource element offset corresponding to each symbol corresponding to the positioning reference signal is successively (k1')L, (k2')L, . . . (kK') L or (k1', k2', . . . , kK')L, where k1', k2' . . . kK' are integers from 0 to K−1 and different from each other, K is the value of the comb, L is the length of the orthogonal cover code, (*) L means that the content in the bracket is repeated for L times, and both K and L are positive integers.

2. The method of claim 1, wherein the feature of the orthogonal cover code comprises at least one of a type, a time domain length, a time domain interval, and a frequency domain length; and the type comprises at least one of a time domain orthogonal cover code, a frequency domain orthogonal cover code, and a time-frequency domain orthogonal cover code.

3. The method of claim 1, wherein, determining, based on the value of the comb and the feature of the orthogonal cover code, a resource element offset corresponding to each symbol corresponding to the positioning reference signal, comprises:

determining the minimum number of symbols of the positioning reference signal based on a product of the value of the comb and the time domain length of the orthogonal cover code, and determining resource element offsets corresponding to symbols corresponding to the positioning reference signal, the number of symbols corresponding to the positioning reference signal being greater than or equal to the minimum number of symbols of the positioning reference signal;

wherein, the resource element offsets corresponding to a same orthogonal cover code are identical, and the resource element offsets corresponding to different orthogonal cover codes are different.

4. The method of claim 1, wherein, determining, based on the value of the comb and the feature of the orthogonal cover code, a resource element offset corresponding to each symbol corresponding to the positioning reference signal, comprises:

determining the minimum number of symbols of the positioning reference signal based on the value of the comb, and determining at least one of resource element offsets and frequency domain resource element indexes corresponding to symbols corresponding to the positioning reference signal, wherein the number of symbols corresponding to the positioning reference signal is greater than or equal to the minimum number of symbols of the positioning reference signal, and the frequency domain resource element index corresponding to a same orthogonal cover code is determined by the resource element offset of the same symbol and the frequency domain length of the orthogonal cover code.

5. The method of claim 1, wherein, determining, based on the value of the comb and the feature of the orthogonal cover code, a resource element offset corresponding to each symbol corresponding to the positioning reference signal comprises:

determining the minimum number of symbols of the positioning reference signal based on a product of the value of the comb and the time domain length of the orthogonal cover code, and determining at least one of resource element offsets and frequency domain resource element indexes corresponding to symbols corresponding to the positioning reference signal, wherein the number of symbols corresponding to the positioning reference signal is greater than or equal to the minimum number of symbols of the positioning reference signal, and the frequency domain resource element index corresponding to a same orthogonal cover code is determined by the resource element offset of the same symbol and the frequency domain length of the orthogonal cover code.

6. The method of claim 1, wherein, determining, based on the value of the comb and the feature of the orthogonal cover code, a resource element offset corresponding to each symbol corresponding to the positioning reference signal, comprises at least one of:

in response to the time domain length of the orthogonal cover code being 2 and the value of the comb being 2, the resource element offset corresponding to each symbol corresponding to the positioning reference signal is successively 0, 0, 1, 1;

in response to the time domain length of the orthogonal cover code being 2 and the value of the comb being 4, the resource element offset corresponding to each symbol corresponding to the positioning reference signal is successively 0, 0, 2, 2, 1, 1, 3, 3;

in response to the time domain length of the orthogonal cover code being 2 and the value of the comb being 6, the resource element offset corresponding to each symbol corresponding to the positioning reference signal is successively 0, 0, 3, 3, 1, 1, 4, 4, 2, 2, 5, 5;

in response to the time domain length of the orthogonal cover code being 2 and the value of the comb being 8, the resource element offset corresponding to each symbol corresponding to the positioning reference signal is successively 0, 0, 4, 4, 2, 2, 6, 6, 1, 1, 5, 5, 3, 3, 7, 7; and in response to the time domain length of the orthogonal cover code being 2 and the value of the comb being 12, the resource element offset corresponding to each symbol corresponding to the positioning reference signal is successively 0, 0, 6, 6, 3, 3, 9, 9, 1, 1, 7, 7, 4, 4, 10, 10, 2, 2, 8, 8, 5, 5, 11, 11.

7. The method of claim 1, wherein, determining, based on the value of the comb and the feature of the orthogonal cover code, a resource element offset corresponding to each symbol corresponding to the positioning reference signal, comprises at least one of:

in response to the time domain length of the orthogonal cover code being 4 and the value of the comb being 2, the resource element offset corresponding to each symbol corresponding to the positioning reference signal is successively 0, 0, 0, 0, 1, 1, 1, 1;

in response to the time domain length of the orthogonal cover code being 4 and the value of the comb being 4, the resource element offset corresponding to each symbol corresponding to the positioning reference signal is successively 0, 0, 0, 0, 2, 2, 2, 2, 1, 1, 1, 1, 3, 3, 3, 3; and in response to the time domain length of the orthogonal cover code being 4 and the value of the comb being 6, the resource element offset corresponding to each symbol corresponding to the positioning reference signal is successively 0, 0, 0, 0, 3, 3, 3, 3, 1, 1, 1, 1, 4, 4, 4, 4, 2, 2, 2, 2, 5, 5, 5, 5.

8. The method of claim 1, wherein, determining, based on the value of the comb and the feature of the orthogonal cover code, a resource element offset corresponding to each symbol corresponding to the positioning reference signal, comprises at least one of:

in response to the time domain length of the orthogonal cover code being 2 and the value of the comb being 2, the resource element offset corresponding to each symbol corresponding to the positioning reference signal is successively 0, 1, 0, 1;

in response to the time domain length of the orthogonal cover code being 2 and the value of the comb being 4, the resource element offset corresponding to each symbol corresponding to the positioning reference signal is successively 0, 2, 1, 3, 0, 2, 1, 3;

in response to the time domain length of the orthogonal cover code being 2 and the value of the comb being 6, the resource element offset corresponding to each symbol corresponding to the positioning reference signal is successively 0, 3, 1, 4, 2, 5, 0, 3, 1, 4, 2, 5;

in response to the time domain length of the orthogonal cover code being 2 and the value of the comb being 8, the resource element offset corresponding to each symbol corresponding to the positioning reference signal is successively 0, 4, 2, 6, 1, 5, 3, 7, 0, 4, 2, 6, 1, 5, 3, 7; and in response to the time domain length of the orthogonal cover code being 2 and the value of the comb being 12, the resource element offset corresponding to each symbol corresponding to the positioning reference signal is successively 0, 6, 3, 9, 1, 7, 4, 10, 2, 8, 5, 11, 0, 6, 3, 9, 1, 7, 4, 10, 2, 8, 5, 11.

9. The method of claim 1, wherein, determining, based on the value of the comb and the feature of the orthogonal cover code, a resource element offset corresponding to each symbol corresponding to the positioning reference signal, comprises at least one of:

in response to the time domain length of the orthogonal cover code being 4 and the value of the comb being 2, the resource element offset corresponding to each symbol corresponding to the positioning reference signal is successively 0, 1, 0, 1, 0, 1, 0, 1;

in response to the time domain length of the orthogonal cover code being 4 and the value of the comb being 4, the resource element offset corresponding to each symbol corresponding to the positioning reference signal is successively 0, 2, 1, 3, 0, 2, 1, 3, 0, 2, 1, 3, 0, 2, 1, 3; and in response to the time domain length of the orthogonal cover code being 4 and the value of the comb being 6, the resource element offset corresponding to each symbol corresponding to the positioning reference signal is successively 0, 3, 1, 4, 2, 5, 0, 3, 1, 4, 2, 5, 0, 3, 1, 4, 2, 5, 0, 3, 1, 4, 2, 5.

10. The method of claim 1, wherein, determining, based on the value of the comb and the feature of the orthogonal cover code, a resource element offset corresponding to each symbol corresponding to the positioning reference signal comprises at least one of:

in response to the frequency domain length of the orthogonal cover code being 2 and the value of the comb being 2, the resource element offset corresponding to each symbol corresponding to the positioning reference signal is successively 0, 2; and in response to the frequency domain length of the orthogonal cover code being 2 and the value of the comb being 4, the resource element offset corresponding to each symbol corresponding to the positioning reference signal is successively 0, 4, 2.

11. The method of claim 1, wherein the determining, based on the value of the comb and the feature of the orthogonal cover code, a resource element offset corresponding to each symbol corresponding to the positioning reference signal comprises at least one of the following:

in response to the time domain length of the orthogonal cover code being 2 and the value of the comb being 2, the resource element offset corresponding to each symbol corresponding to the positioning reference signal is successively 0, 0, 2, 2; and in response to the type of the orthogonal cover code being time-frequency domain orthogonal cover code, the time domain length of the orthogonal cover code being 2 and the value of the comb being 4, the resource element offset corresponding to each symbol corresponding to the positioning reference signal is successively 0, 0, 4, 4, 2, 2.

12. The method of claim 10, wherein the frequency domain resource element index of an $i^{th}$ symbol is an index corresponding to M consecutive resource elements starting with the resource element offset on a $k^{th}$ symbol, where i, k and M are all positive integers and M is the frequency domain length of the orthogonal cover code.

13. A communication node, comprising:

at least one processer; and a memory device configured to store at least one program;

wherein the at least one program, when executed by the at least one processor, causes the at least one processor to carry out the determination method of claim 1.

14. A non-transitory computer readable storage medium storing computer programs which, when executed by a processor, cause the processor to carry out a determination method, the method comprising:

determining a comb and an orthogonal cover code of a positioning reference signal; and determining, based on a value of the comb and a feature of the orthogonal cover code, a resource element offset corresponding to each symbol corresponding to the positioning reference signal;

wherein the resource element offset corresponding to each symbol corresponding to the positioning reference signal is successively (k1')L, (k2')L, . . . , (kK') L or (k1', k2', . . . , kK')L, where k1', k2' . . . kK' are integers from 0 to K−1 and different from each other, K is the value of the comb, L is the length of the orthogonal cover code, (*) L means that the content in the bracket is repeated for L times, and both K and L are positive integers.

15. The method of claim 11, wherein the frequency domain resource element index of an $i^{th}$ symbol is an index corresponding to M consecutive resource elements starting with the resource element offset on a $k^{th}$ symbol, where i, k and M are all positive integers and M is the frequency domain length of the orthogonal cover code.

* * * * *